Figure 1:
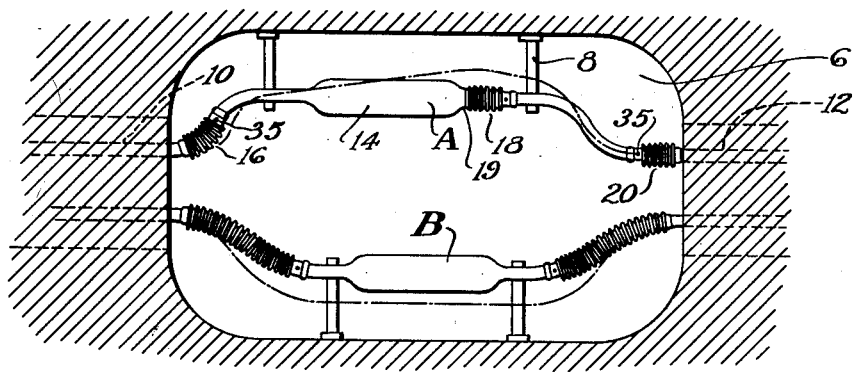

Dec. 22, 1942.    W. B. ELMER    2,306,331
METHODS AND APPARATUS FOR PROTECTING CABLES
Filed May 1, 1940

Witness
Paul F. Bryant

Inventor
William B. Elmer
by his attorneys
Fish Hildreth Canypheney

Patented Dec. 22, 1942

2,306,331

UNITED STATES PATENT OFFICE 2,306,331

METHOD AND APPARATUS FOR PROTECTING CABLES

William B. Elmer, Winchester, Mass.

Application May 1, 1940, Serial No. 332,765

3 Claims. (Cl. 174—12)

The present invention relates to methods and apparatus for protecting cables against injury, and more particularly against injury due to stresses caused by expansions and contractions of the cable unvarying temperature conditions.

Underground lead sheathed cables for electrical transmission and distribution are run in ducts of considerable length between manholes, the separate lengths of cable being spliced or joined within the manholes. Due to temperature changes caused primarily by variations in the electrical load, the lengths of cable in the ducts expand and contract by an appreciable amount, usually at least once each day. If the lead sheathed cables are large in diameter and the manhole small, these expansions and contractions result in cracking of the lead sheaths due to the repeated bending action in the manhole. Compensation is usually afforded by bending or looping the portions of the cable within the manhole so that the longitudinal stresses can be taken up as bending strains without immediate injury to the cable. In small and congested manholes, however, the sheaths will frequently exhibit bulges and cracks which, if not continually repaired, may result in ultimate electrical failure. The repairs are costly and do not remove the source of the trouble. Frequently a long section of cable has to be replaced, simply because of failure of a short portion of the sheath within the manhole. Sheath repairs are not even possible if the cracks occur within or very close to the ducts, or are otherwise inaccessible.

The principal object of the present invention is to remove the limitation on repeated flexing of the cables imposed by the lead sheaths, and to provide a method and means of relieving such stresses in cables without damage to the cables themselves.

With this object in view, the principal feature comprises the application in the manholes of flexible sheath or covering members having sufficient flexibility and elasticity to relieve the bending stresses occasioned by the expansion and contraction of the duct lengths of cable. In the preferred form of the invention which is best applicable to new structures, the stress-relieving sheath members are metallic bellows capable of withstanding a number of bending stresses equivalent to a long cable life without injury. These members may be secured to the lead sheaths preferably by soldering, in such a way as to provide a continuous metallic sheath structure. Where manhole space permits it has been found desirable to use three bellows for each cable in each manhole, so spaced as to localize all stresses at the bellows without imposing injurious stresses on the lead sheath portions of the cables. But in cases where space is more limited the use of two bellows of somewhat greater length has been found satisfactory.

For the repair of existing cables, the joints or splices having already been made, the invention also provides a flexible and elastic covering likewise having provision for maintaining continuous electrical shielding of the cable. In this form of the invention as well as in the form utilizing the metallic bellows, the cable is sealed to retain the filling compound and also to prevent entrance of air or moisture.

A further feature of the invention contemplates a method of scavenging the air from the flexible joint in order to protect against deterioration of the cable insulation.

Other features of the invention comprise certain combinations and arrangements of parts and modes of operation hereinafter described and particularly defined in the claims.

Figure 2:
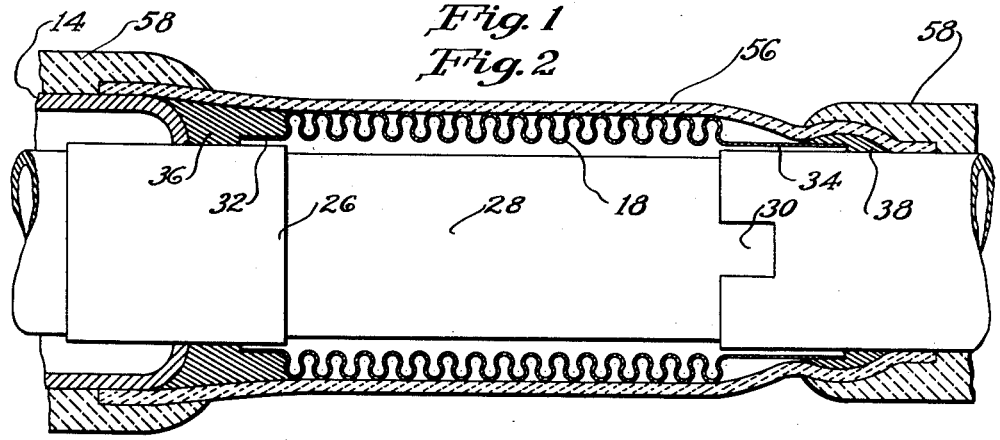
Figure 3:
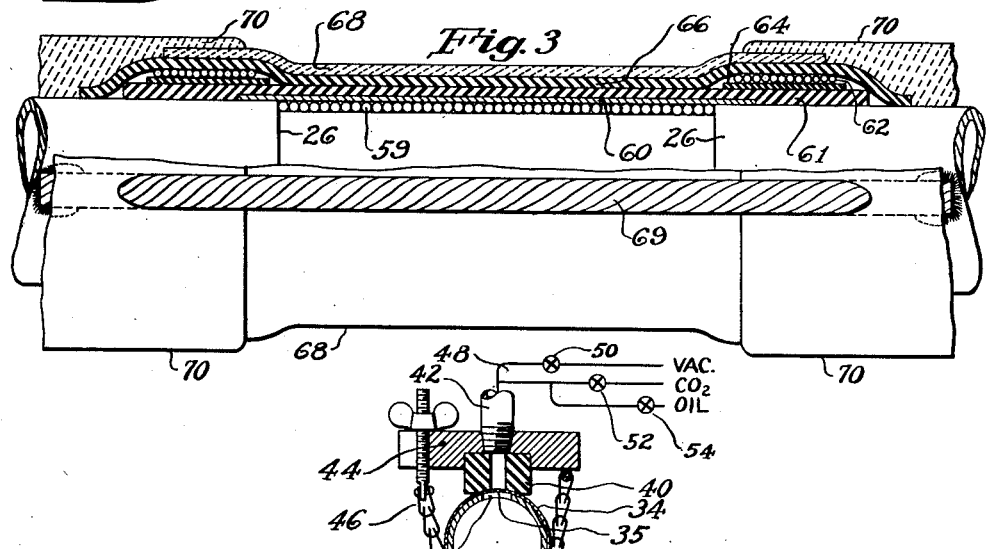
Figure 4:
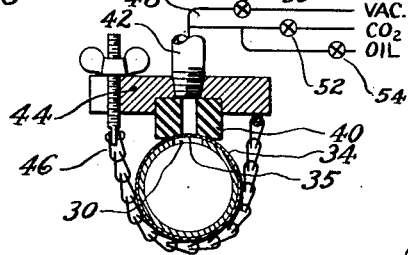

In the accompanying drawing Fig. 1 is a horizontal sectional view illustrating a manhole with two lengths of cable prepared according to the present invention; Fig. 2 is a sectional view on an enlarged scale through the completed sheath joint; Fig. 3 is a sectional view of a modified form of flexible sheath joint particularly adaptable to cables which have been already installed; and Fig. 4 is a detailed view illustrating means for scavenging the air from the sheath joint.

Fig. 1 illustrates a manhole 6 having hangers 8 on which are supported two jointed cables and designated generally at A and B. The cable A comprises two lengths 10 and 12 coming in through ducts at left and right and joined by the usual joint or splice 14. The bends are of usual shape to convert the longitudinal stresses of the duct lengths into bending stresses in the manhole. The cable B is similarly disposed. According to usual methods the cable lengths 10 and 12 would have a continuous lead sheath running to the joint 14 which would also be wiped with lead to form a continuous enclosure for the entire cable.

Referring first to cable A which embodies the preferred form of the invention, this cable is provided with thoroughly tinned metallic bellows at 16, 18 and 20. The bellows 16 is disposed at the first bend of one length of cable and the bellows 18 and 20 are in the other length. The bellows 18 is disposed immediately adjacent to the joint 14, and the bellows 20 at the point where the cable enters the duct from the manhole. For reasons to be explained later, this arrangement of the bellows has proved most satisfactory. It will be noted that this arrangement may require the joint 14 to be placed off center so that the hangers must occasionally be relocated from their usual positions.

The method of applying the bellows will now be described. After the cable ends have been run into the manhole the bellows 16 and 20 are slipped on. The cables are bent to the proper shape, bellows 18 are slipped on, and the joint 14 is made and wiped with one end of bellows 18 wiped integral with one of the normal joint wipes 19. Portions of the lead sheaths are then carefully removed at the places where the bellows 16 and 20 are to be applied. As shown in Fig. 2, the sheath 26 has been cut to expose the cable insulation 28 over a length somewhat shorter than the length of the bellows to be applied. A rectangular slot 30 is provided in the top of the sheath at one end of the cut to serve as a filling opening as will be subsequently described. The metal bellows are of usual form, having a number of convolutions and provided at their ends with flanges 32 and 34 overlying the uncut portions of the sheath. The flange diameter is slightly larger than the sheath to permit the bellows to be moved over the straight or bent cable. The flange 34 has a filling hole 35 which is made to register with the slot 30. The flanges 32 and 34 may then be tapped lightly with a hammer to cause them to engage tightly with the sheath, then a soldered or wiped joint is made at each end of the bellows as indicated at 36 and 38. For the bellows 18 which is applied adjacent to the joint 14, the wipe 36 preferably merges with the lead covering of the joint 14 and also fills to the top of the first corrugation of the bellows. The wipe 38 overlies the end of the long flange 34, care being taken to prevent covering of the filling hole 35. The bellows 16 and 20 are secured in a similar manner, except that each wipe is similar to that indicated at 38 in Fig. 2.

The several bellows are then scavenged and filled with oil. This is accomplished by means of the fitting shown in Fig. 4 comprising a flexible rubber member 40 to overlie the filling hole 35 and having a central opening communicating with a pipe 42. These parts are mounted on a block 44 which can be attached around the end flange 34 by a chain and wing nut assembly 46. The pipe 42, as shown diagrammatically in Fig. 4, is connected with piping 48 provided with valves 50, 52 and 54 to control the application of a vacuum and to admit carbon dioxide and oil to the cable. By operation of the valves 50 and 52 as much air as possible is pumped out and carbon dioxide under pressure is introduced, this operation usually being repeated more than once to effect sufficiently complete scavenging of the air from the bellows. Then while vacuum is applied oil is admitted by opening the valves 54, thereby substantially filling the bellows. After filling, the hold 35 is covered by a flat piece of tinned copper which is attached to the bellows flange with solder.

Each bellows joint is provided with arc-proofing material indicated at 56, preferably in the form of asbestos tape or listing, which is wound around the bellows with considerable overlap of adjacent turns. The listing extends well beyond the soldered connections of the flanges. Thereafter the usual cement covering 58 is applied to the cable sections and, as indicated in Fig. 2, it overlaps the ends of the asbestos listing so that all portions of the cable within the manhole, except the bellows, are encased in arc-proofing cement.

The method described above utilizing three bellows is preferred, since it allows the sections of the cable sheaths between bellows to move as a unit and without requiring the bellows to assume reverse curvatures. When the cable contracts or expands the bending stresses are practically all taken up by the flexing of the bellows. The lead sheath proper of the cable is not required to undergo any substantial bending strains. The duct lengths of cable may expand or contract a considerable amount. The section of cable including the joint, between the bellows 16 and the bellows 18, and the section between 18 and 20, each move as a relatively rigid unit on the hangers but no appreciable stresses are applied to the sheaths or the concrete covering.

The arrangement illustrated for cable B in Fig. 1 comprises two long bellows arranged symmetrically on opposite sides of the joint. These bellows are attached in the same manner as described for cable A. This arrangement is also satisfactory for taking up stresses and thereby protecting the cable sheath, and may be applied where space would be insufficient to accommodate the three bellows as previously described. For cable B the bellows assume reverse curves as indicated by the drawing. In some instances where manhole space is greatly limited a single long bellows may be applied at one side and a short one at the other side, in which case the long bellows necessarily assumes a reverse curve. In any event the flexible covering members are of sufficient length and number to insure that no appreciable bending stresses are applied to the relatively inelastic cable sheaths.

Under the influence of longitudinal stresses due to temperature changes, each cable section between bellows is free to move as a unit. In Fig. 1, I have illustrated in dot-and-dash lines the positions assumed by the center lines of cable A and B under a considerably increased temperature. In each case the movement from normal position has been somewhat exaggerated in the drawing. The relatively inflexible sections of unstripped cable move bodily without the application of stresses to the lead sheath, these stresses being substantially taken up by the bellows.

The foregoing methods are applicable in general to new cable installations in which the bellows can be slipped on before formation of the joint. For old installations the arrangement shown in Fig. 3 may be preferred in order to avoid opening of the joint. The lead sheath 26 is first stripped to expose the insulation as in the cases previously described. The cable may be stripped at either three or two places, as described in conjunction with cables A and B of Fig. 1. A layer 59 of soft twine saturated with cable-insulating compound is then wound loosely over the stripped portion of the cable. If the cable is of the belted type, a layer of copper braid 60 is wound tightly over the twine and the ends of the sheath to form a continuous metallic covering for the cable. But if the cable is of the so-called type H, in which the insulated conductors are individually electrically shielded, this metallic covering may be omitted. When the copper braid 60 is used, the principal purpose of the twine layer is to protect the braid against abrupt stretching or bending where it is in contact with the cable sheath since the twine is free to slide slightly over the smooth paper insulation when the cable is bent. Whether or not the braid is used, the twine layer fills in the space between the sheath ends and affords a uniform support for subsequent layers applied to the cable.

One or more layers 61 of oil-resisting and waterproof synthetic elastic tape, such as thiokol coated with cement, are then applied to overlap the ends of the cable sheath by a considerable amount. This tape is securely bound to the sheath by a tightly wound layer 62 of binding wire, preferably tinned copper. To prevent the binding wire from cutting into the elastic tape, a layer of friction tape 64 is preferably wound over the ends of the elastic tape before the application of the binding wire. The whole is then covered by a winding 66 of cotton tape impregnated with plastic type insulating paint, and finally, with an arc-proofing layer 68 of asbestos listing. To insure continuous electrical conductivity, a braid jumper 69 is soldered at its ends to the cable sheath. Finally, as in the cases previously described, cement 70 is applied to the cable to overlap the ends of the asbestos listing, but without covering the flexible section described immediately above.

Since the several layers are wound tightly over the cable, no scavenging and filling operations are necessary as in the case of the bellows method.

The method illustrated in Fig. 3 has been found entirely satisfactory for relieving the bending stresses while still affording adequate moisture- and fireproofing. Although this method has been mentioned particularly for old installations, it is also applicable for new installations and is particularly useful therefor when no bellows of the proper size is available to provide the maximum flexible length within a manhole of restricted size. In general, however, the method employing metallic bellows is to be preferred for new installations, mainly because of the greater assurance of long service life which they provide.

Having thus described the invention, I claim:

1. In a cable installation employing metal-sheath cable in duct lengths with an intermediate portion offset from said duct lengths and bent portions connecting the duct lengths with the offset portion, means for relieving the cable sheath of stresses due to changes in curvature of the bent portions of the cable comprising flexible liquid-tight coverings substituted for stripped portions of the cable sheath between the duct lengths and the offset portion to provide at least three zones of flexure of greater flexibility than the cable sheath to permit sheathed portions between the duct lengths to move without appreciable bending upon expansion or contraction of the duct lengths of cable.

2. In a cable installation employing metal-sheath cable in duct lengths with an intermediate portion offset from said duct lengths and bent portions connecting the duct lengths with the offset portion, means for relieving the cable sheath of stresses due to changes in curvature of the bent portions of the cable comprising flexible metallic bellows substituted for stripped portions of the cable sheath between the duct lengths and the offset portion to provide at least three zones of flexure of greater flexibility than the cable sheath to permit sheathed portions between the duct lengths to move without appreciable bending upon expansion or contraction of the duct lengths of cable.

3. In a cable installation employing metal-sheath cable in duct lengths with an intermediate portion offset from said duct lengths and bent portions connecting the duct lengths with the offset portion, means for relieving the cable sheath stresses due to changes in curvature of the bent portions of the cable comprising flexible wrappings of moisture-proof material substituted for stripped portions of the cable sheath between the duct lengths and the offset portion to provide at least three zones of flexure of greater flexibility than the cable sheath to permit sheathed portions between the duct lengths to move without appreciable bending upon expansion or contraction of the duct lengths of cable.

WILLIAM B. ELMER.

CERTIFICATE OF CORRECTION.

Patent No. 2,306,331. December 22, 1942.

WILLIAM B. ELMER.

It is hereby certified that error appears in the printed specification of the above numbered patent requiring correction as follows: Page 1, first column, line 5, for "unvarying" read --under varying--; page 2, first column, line 65, for "valves" read --valve--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.